United States Patent [19]

Izzo et al.

[11] Patent Number: 5,600,685
[45] Date of Patent: Feb. 4, 1997

[54] TOOL FOR UNLATCHING EXTENDED HANDLE AND STANDARD HANDLE CONTROL RODS

[75] Inventors: Kenneth R. Izzo, Los Gatos; Robert K. Lovell; Terry K. Dallas, both of San Jose, all of Calif.

[73] Assignee: General Electric Company, San Jose, Calif.

[21] Appl. No.: 427,543

[22] Filed: Apr. 24, 1995

[51] Int. Cl.$^6$ .................................................. G21C 19/00
[52] U.S. Cl. ............................................................ 376/260
[58] Field of Search ..................................... 376/260, 262

[56] References Cited

U.S. PATENT DOCUMENTS

| | | | |
|---|---|---|---|
| 5,329,563 | 7/1994 | Baversten | 376/260 |
| 5,521,950 | 5/1996 | Whitling | 376/260 |

*Primary Examiner*—Daniel D. Wasil
*Attorney, Agent, or Firm*—James E. McGinness

[57] ABSTRACT

An unlatching tool which can be used to uncouple and grapple standard handle and extended handle control rods from their associated control rod drives. The unlatching tool is lowered onto the handle of a control rod residing in the reactor core. Due to differences in the shapes of the handles of the standard handle and extended handle control rods, the tool is able to sense the type of control rod present and, through the use of a pneumatically actuated cylinder, position the unlatching mechanism at the appropriate elevation. In particular, a four-way valve, that is actuated by contact with the top corner of the handle of the extended handle control rod and is not contacted by the handle of the standard handle control rod, is used to differentiate between control rod types. The unlatching mechanism is positioned relative to the unlocking handle on the control rod using a pneumatic cylinder activated by the four-way valve. The cylinder has a stroke length equal to the difference in length between the standard handle and extended handle control rods.

20 Claims, 11 Drawing Sheets

TOOL FOR UNLATCHING EXTENDED HANDLE AND STANDARD HANDLE CONTROL RODS

FIELD OF THE INVENTION

This invention relates generally to maintenance of a control rod drive of a boiling water reactor. Specifically, the invention relates to tools for disconnecting a control rod from its associated control rod drive during a maintenance operation.

BACKGROUND OF THE INVENTION

Control rod drives are used to position control rods in boiling water reactors (BWRs) to control the fission rate and fission density, and to provide adequate excess negative reactivity to shutdown the reactor from any normal operating or accident condition at the most reactive time in core life. Each control rod drive is mounted vertically in a control rod drive housing which is welded to a stub tube, which in turn is welded to the bottom head of the reactor pressure vessel. De-mineralized water supplied by the control rod drive hydraulic system serves as the hydraulic fluid for control rod drive operation.

The control rod drive is a double-acting, mechanically latched hydraulic cylinder. The control rod drive is capable of inserting or withdrawing a control rod at a slow controlled rate for normal reactor operation and of providing rapid control rod insertion (scram) in the event of an emergency requiring rapid shutdown of the reactor. This is accomplished by sliding vertical displacement of an index tube to which the control rod is coupled.

Figure 1A:
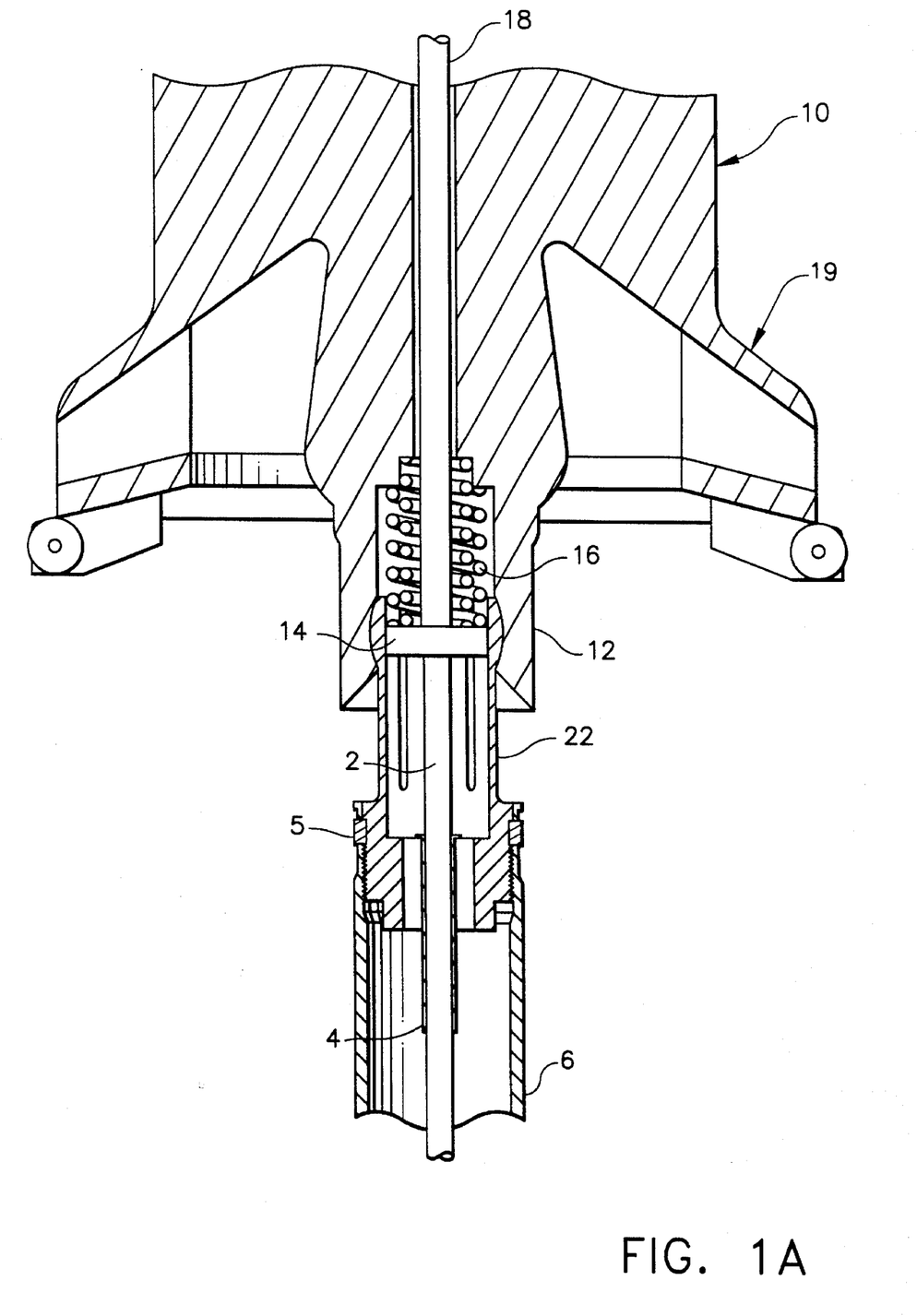
FIG. 1A is a sectional schematic of a control rod and a control rod drive in a latched state.

Referring to FIG. 1A, a spud 22 at the top of the index tube 6 of the control rod drive engages and locks into a socket 12 at the bottom of the control rod 10. Once coupled, the control rod drive and control rod form an integral unit which must be manually uncoupled by specific procedures before a control rod drive or control rod may be removed from the reactor. Index tube 6 is a nitrided stainless steel tube threaded internally at its upper end. The spud 22 in turn is externally threaded for engaging the threads in the upper end of index tube 6. This connection is secured in place by means of a band 5 with tab locks.

As seen in FIG. 1A, the spud 22 has a plurality of spring fingers which extend vertically upward and which flex radially. The spring fingers permit the spud 22 to enter the mating socket 12 on the control rod 10. During a latching operation, a lock plug 14 enters spud 22 from socket 12. The lock plug 14 has a circular outer periphery of radius such that radially inward flexure of the spud spring fingers is blocked. This engagement prevents uncoupling of the spud and the socket.

Figure 1B:
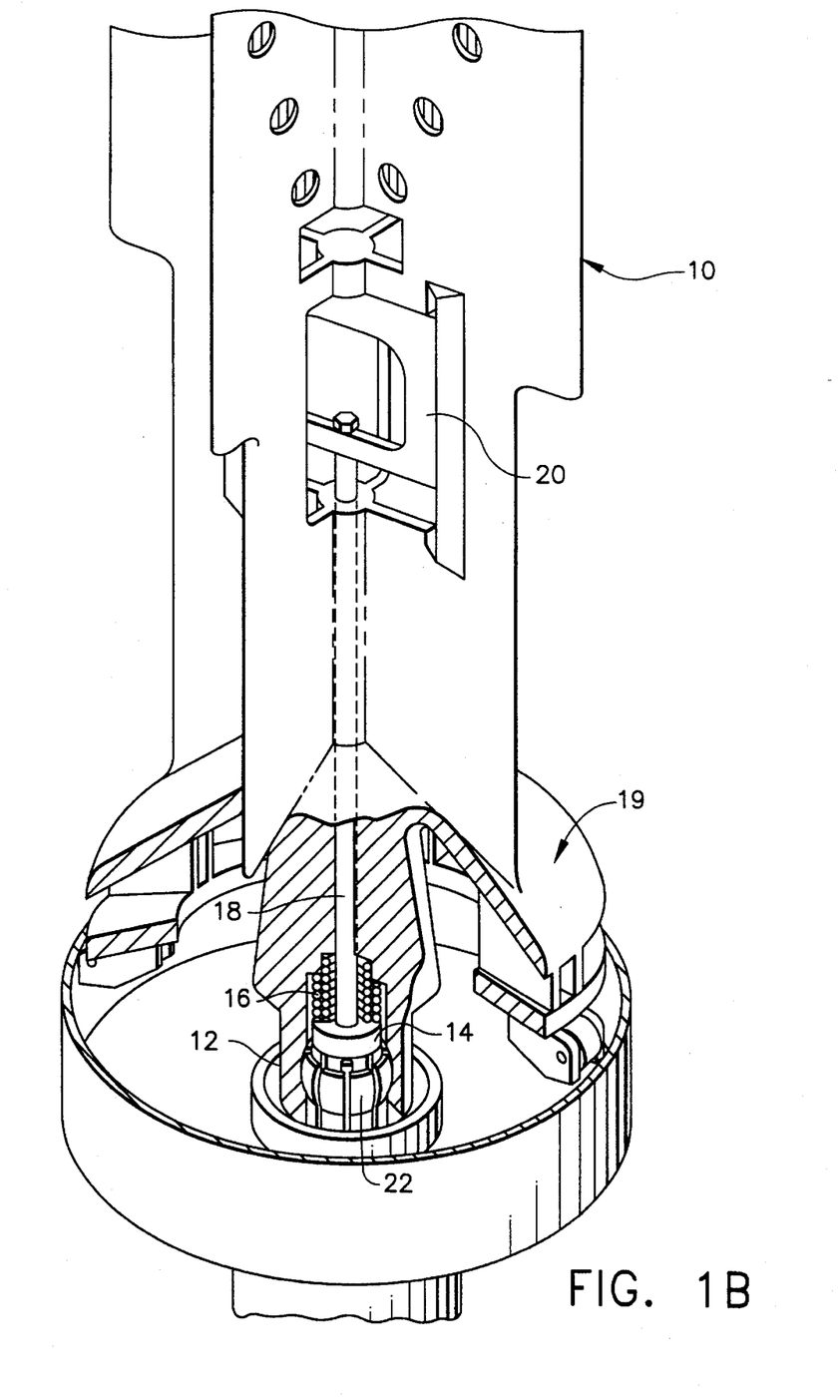
FIG. 1B is a partly sectioned isometric view of a control rod and a control rod drive in an unlatched state.

In accordance with conventional practice, two control rod uncoupling mechanisms are provided. In the first uncoupling technique, the lock plug 14 is raised against the return force of a spring 16 by an actuating shaft 18 which extends through the center of the control rod velocity limiter 19 to an unlocking handle 20 (see FIG. 1B) in the shape of a D-ring. The top end of the actuating shaft is connected to an unlocking handle 20 in the shape of a D-ring. The actuating shaft 18 is lifted by manipulation of unlocking handle 20. The control rod 10, with lock plug 14 raised, may then be grappled and lifted from the control rod drive.

Alternatively, the lock plug 14 is raised from below to uncouple the control rod drive from below the reactor vessel. To accomplish this, a special tool is attached to the bottom of the control rod drive and used to raise the piston tube (not shown). This action in turn raises an uncoupling rod, lifting lock plug 14 so that spud 22 disengages from the control rod coupling socket 12. The uncoupling rod consists of a rod 2 and a tube 4, supported in the base of the spud at the upper end of the control rod drive, as seen in FIG. 1A. The rod 2 is welded to the flared end of tube 4 such that a predetermined distance exists between the top of rod 2 and the top end of spud 22. In addition to its function in uncoupling, rod 2 positions the control rod lock plug 12 such that it supports (i.e., opposes radially inward deflection of) the spud fingers when the control rod 10 and control rod drive are coupled.

In accordance with conventional practice, the unlocking handle 20 is lifted using an unlatching tool. This unlatching tool is also capable of removing the control rod from the reactor core once it is uncoupled. The unlatching tool comprises an actuator finger, which must be precisely located underneath the unlocking handle, and a grapple hook, which hooks under the handle (8 in FIG. 2A and 8' in FIG. 2B). In response to activation of a pneumatic cylinder, the actuator finger raises the unlocking handle to uncouple the control rod. In response to activation of a hoist, the grapple hook lifts the uncoupled control rod.

Figure 2A:
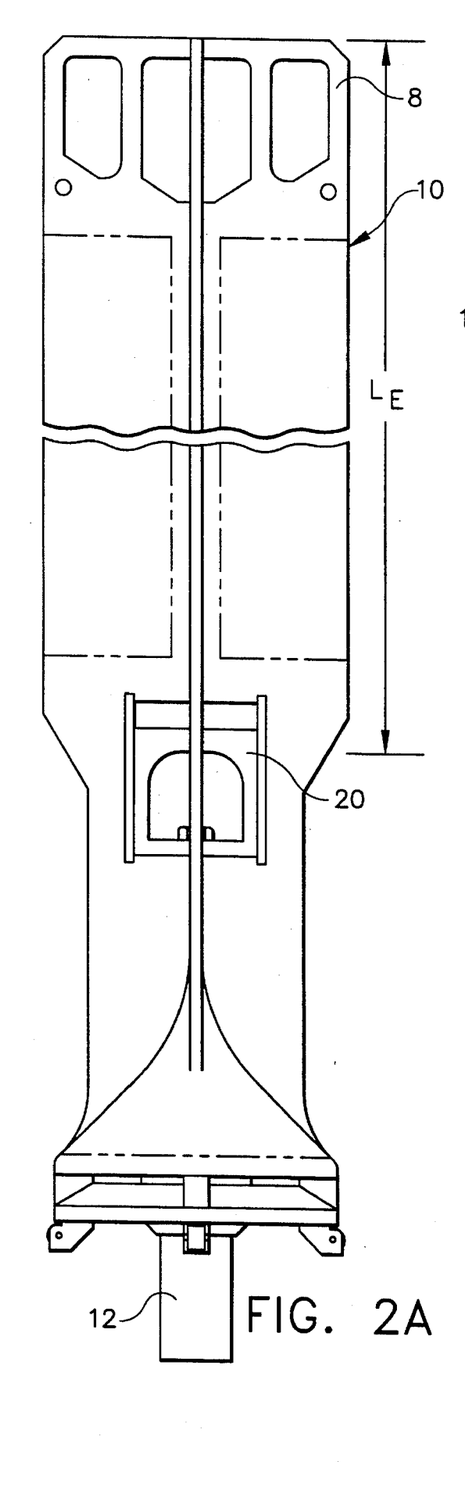
FIGS. 2A and 2B are elevation views of extended handle and standard handle control rods, respectively.
Figure 2B:
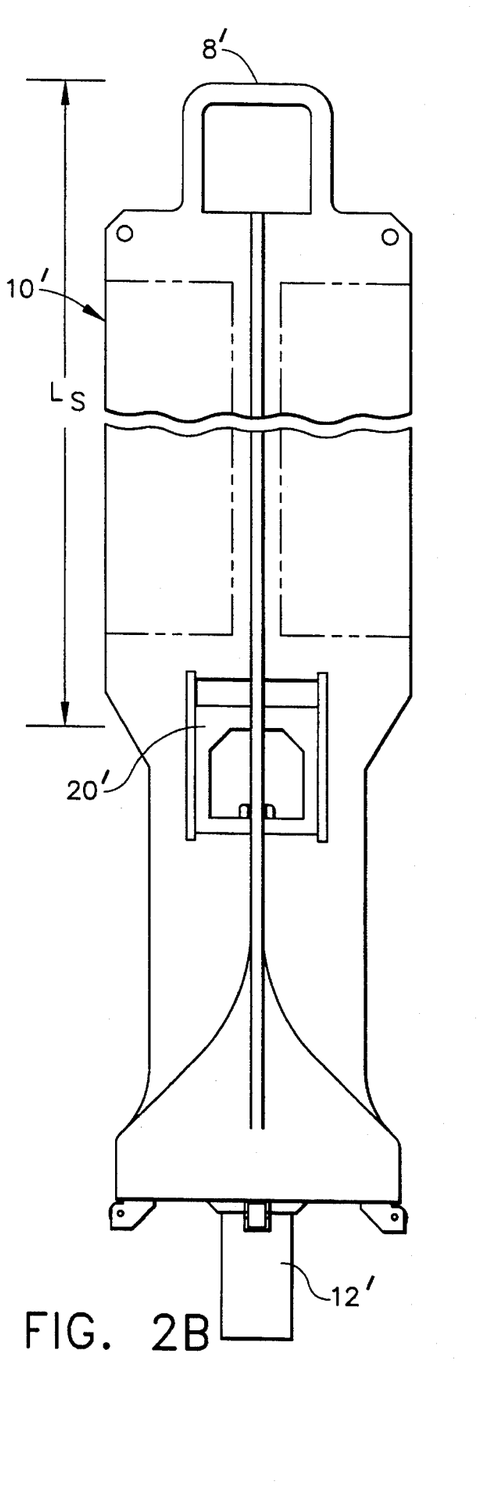

Recently, a new type of control rod with an increased overall length has been put into service (see FIG. 2A). The increased length changes the distance from the control rod handle to the unlocking handle, i.e., $L_E > L_S$. Because the existing unlatching tool for standard handle control rods (one of which is shown in FIG. 2B) has a fixed-length arm that supports the unlatching mechanism, that tool is not able to uncouple any extended handle control rods that may reside in the reactor core.

Initially, a new unlatching tool for extended handle control rods, using a concept identical to the existing unlatching tool but with a longer arm, was designed and built. In application, both the original and new tools had to be available to uncouple all control rods. Also required was detailed knowledge of the location and type of control rods in the core. This dual-tool method is inefficient and time consuming because the tools must be switched back and forth. Thus, there is a need for a single unlatching tool capable of uncoupling and grappling both types of control rods that may be present in the reactor core.

SUMMARY OF THE INVENTION

The present invention is an unlatching tool which can be used to uncouple and grapple standard handle and extended handle control rods from their associated control rod drives. The unlatching tool is lowered onto the handle of a control rod residing in the reactor core. Due to differences in the shapes of the handles of the standard handle and extended handle control rods, the tool is able to sense the type of control rod present and, through the use of a pneumatically actuated cylinder, position the unlatching mechanism at the appropriate elevation.

In particular, a four-way valve, that is actuated by contact with the top corner of the handle of the extended handle control rod and is not contacted by the handle of the standard handle control rod, is used to differentiate between control rod types. The unlatching mechanism is positioned relative to the unlocking handle on the control rod using a pneumatic cylinder activated by the four-way valve. The cylinder has a stroke length equal to the difference in length between the standard handle and extended handle control rods. When the tool is actuated by the operator, a second pneumatic cylinder "piggy-backed" on the first pneumatic cylinder lifts the unlatching mechanism and the unlocking handle in contact therewith, thereby uncoupling the control rod from the spud of the control rod drive. A grapple hook then swings into place and captures the handle of the control rod in preparation for lifting.

A constant supply of pressurized air is supplied to the cylinders. The flow of pressurized air is directed by opening of the four-way valve and a series of check valves and flow control valves in accordance with a system for timing the sequence of the positioning, unlatching and grappling operations. Tubing connections between the components were simplified by the use of several manifold blocks.

When the tool is actuated by the operator, the unlatching mechanism unlatches the control rod from the control rod drive and the grapple hook swings into position for lifting the control rod. The control rod can then be removed from its present position in the core by lifting with the hoist cable.

For safety reasons, the control rod hook will remain engaged and the control rod will remain grappled even in the event of an interruption or anomaly in the air supply or in the event of an inadvertent signal to disengage the control rod by the operator. The control rod can be released when the weight is taken off of the grapple hook, such as is the case when the control rod has been properly seated in a storage location.

DETAILED DESCRIPTION OF THE PREFERRED EMBODIMENT

The control rod unlatching tool in accordance with the invention is used to unlatch a control rod from its control rod drive and to hoist the control rod by its handle. The tool is designed to unlatch both extended handle (long) and standard handle (short) control rods. The control rod unlatching tool consists of a frame assembly which supports and positions three pneumatically actuated devices: a positioning cylinder, a control rod unlatching actuator, and a grapple hook and lifting tube assembly. The frame contains a mechanically actuated four-way valve which controls the air supply to the positioning cylinder.

In accordance with the preferred embodiment of the invention, the control rod unlatching tool is a pneumatically operated device. Pressurized air is used to position and operate the actuator link and to position the grapple hook. A means is also provided to manually disengage the hook, if required.

Referring to FIGS. 3A–3D, the main elements of the pneumatic system are three double-acting air cylinders 24, 26 and 28 (with respective pistons 25, 27 and 29), a four-way valve 32, four check valves 34 and 36, and six flow control valves (not shown), each flow control valve being in flow communication with a respective one of the six ports of cylinders 24, 26 and 28. The main air supply to the unlatching tool is controlled from the hoist pendant (not shown) on the refueling platform.

Two of the air cylinders (26 and 28) work in parallel to synchronize operation of the actuator link with that of the grapple hook. The third air cylinder (24), controlled by a pushbutton operator 33 on the four-way valve 32, positions the actuator link mechanism to adapt to extended handle (long) and standard handle (short) control rods. The position of cylinder 24 when the tool is seated on the control rod will be determined by the configuration of the control rod handle.

The check valves 34, 36 assure a positive supply of air to the positioning cylinder 24 regardless of the status of the switch on the pendant (engaged or disengaged).

Figure 3A:
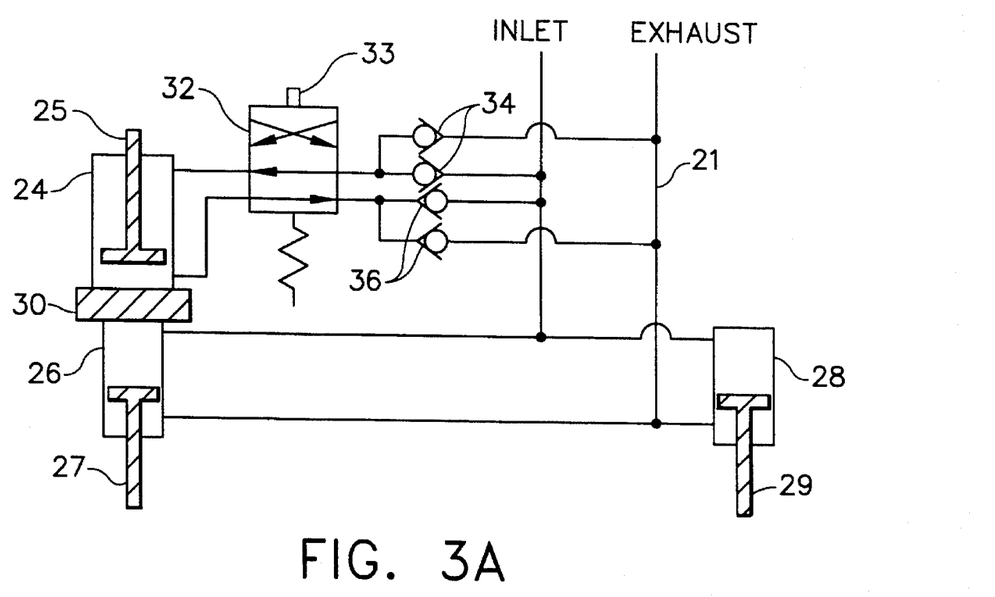
FIGS. 3A and 3B are schematics showing operation of the four-way valve and cylinders for the standard handle control rod in accordance with the preferred embodiment of the invention, resulting in the actuator finger being retracted (FIG. 3A) or extended/engaged (FIG. 3B).
Figure 3B:
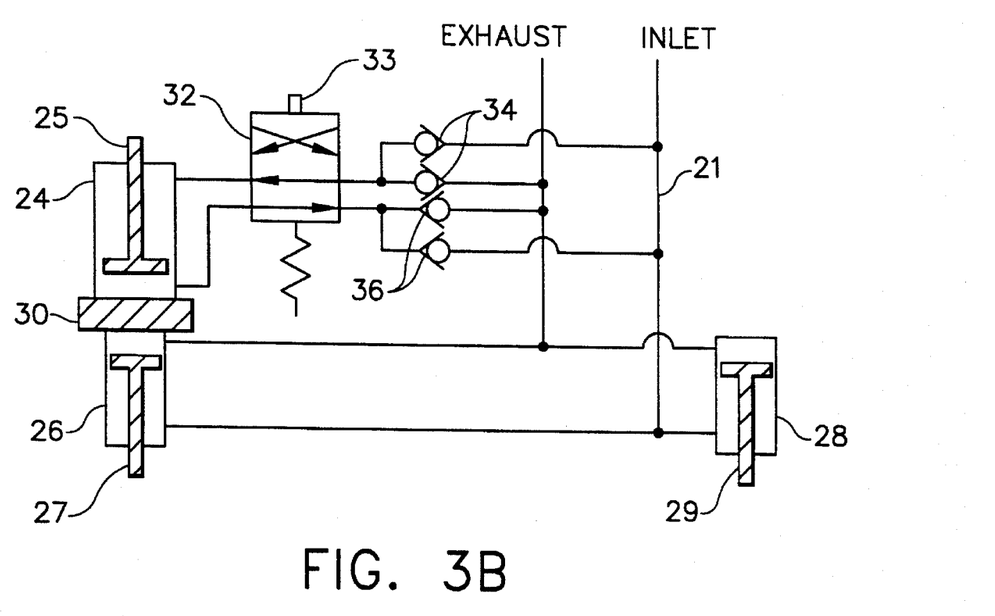

Operation of four-way valve 32 and cylinders 24, 26 and 28 for unlatching the standard length control rod is shown schematically in FIGS. 3A and 3B.

Depressing the ENGAGE pushbutton on the control pendant pressurizes the inlet line shown in FIG. 3B. Air pressure is applied at the retract ports of all cylinders. The finger 38 of the actuator linkage 40 is extended (see FIG. 6B) and raised to engage and lift the D-ring unlocking handle 20 or 20' of the spud-decoupling mechanism of the control rod in response to retraction. At the same time the grapple hook 94 (see FIG. 4B) swings into position to engage the control rod handle.

Depressing the DISENGAGE pushbutton on the control pendant pressurizes the inlet line shown in FIG. 3A. Air pressure is applied to extend the cylinders which operate the actuator linkage and the grapple hook. The finger of the actuator linkage is lowered and retracted, disengaging it from the handle of the control rod decoupling mechanism. Simultaneously, the hook swings clear of the control rod handle and the unlatching tool can be disengaged from the control rod.

The condition of positioning cylinder 24 is unaffected by operation of the control pendant on the refueling platform. This is because the position of the four-way valve 32 is unaffected when the unlatching tool engages a standard handle control rod (shown in FIG. 2B).

Figure 3C:
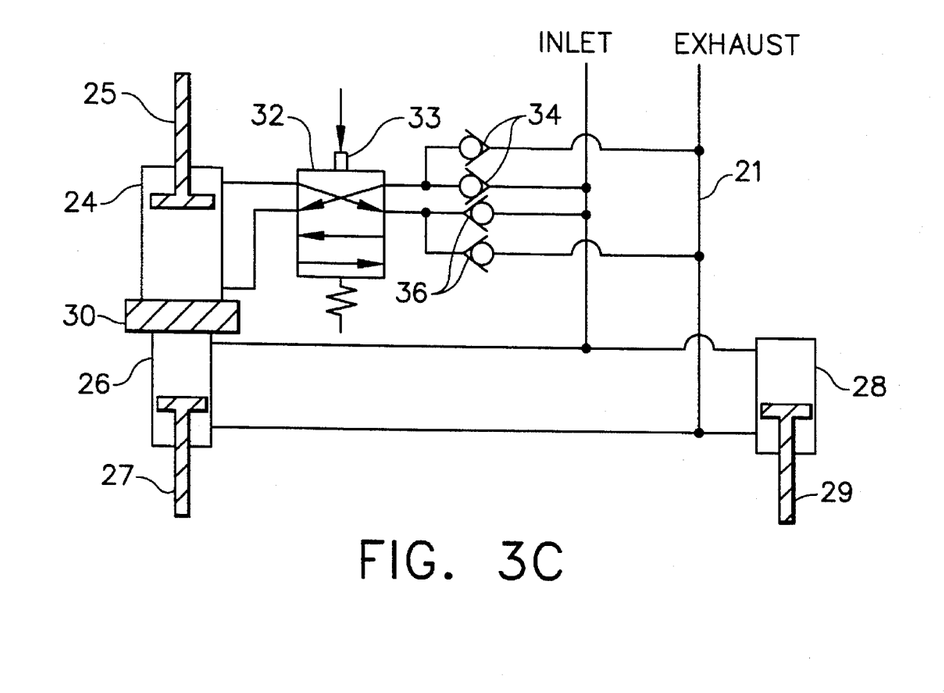
FIGS. 3C and 3D are schematics showing operation of the four-way valve and cylinders for the extended handle control rod in accordance with the preferred embodiment of the invention, resulting in the actuator finger being retracted (FIG. 3C) or extended/engaged (FIG. 3D).
Figure 3D:
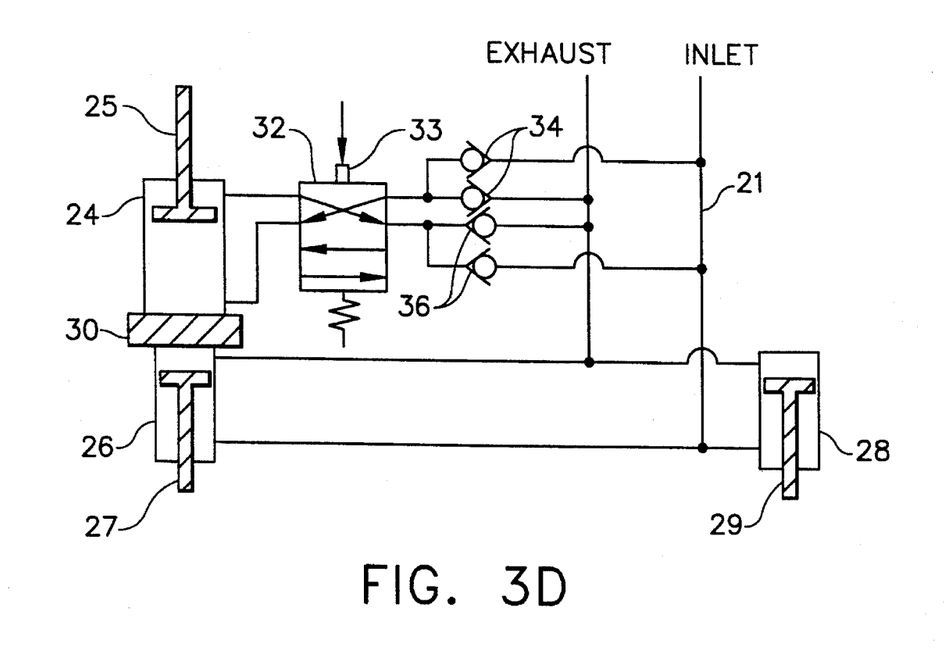

Operation of the four-way valve 32 and cylinders 24, 26 and 28 for unlatching a control rod having an "extended" handle is shown schematically in FIGS. 3C and 3D.

As the unlatching tool is seated on the extended handle control rod 10 (shown in FIG. 2A), the top portion of the handle of the control rod will depress the pushbutton operator 33 on the four-way valve 32. This causes the four-way valve 32 to switch air pressure from the retract port of the positioning cylinder 24 to the extend port. Extension of the piston rod 25 forces the cylinder 24, and the cylinder 26 piggybacked thereon by means of a cylinder spacer 30, to be lowered. As a consequence, the entire actuator linkage mechanism 40, which is connected to cylinder 26, will also be lowered. Repositioning of the linkage is required to engage the D-ring unlocking handle 20 of the spud-decoupling mechanism on the extended handle (long) control rod 10.

After the linkage mechanism 40 is repositioned by action of the four-way valve 32 and positioning cylinder 24, operation of the control rod unlatching tool is the same as described hereinabove for the standard handle control rod.

Figure 4A:
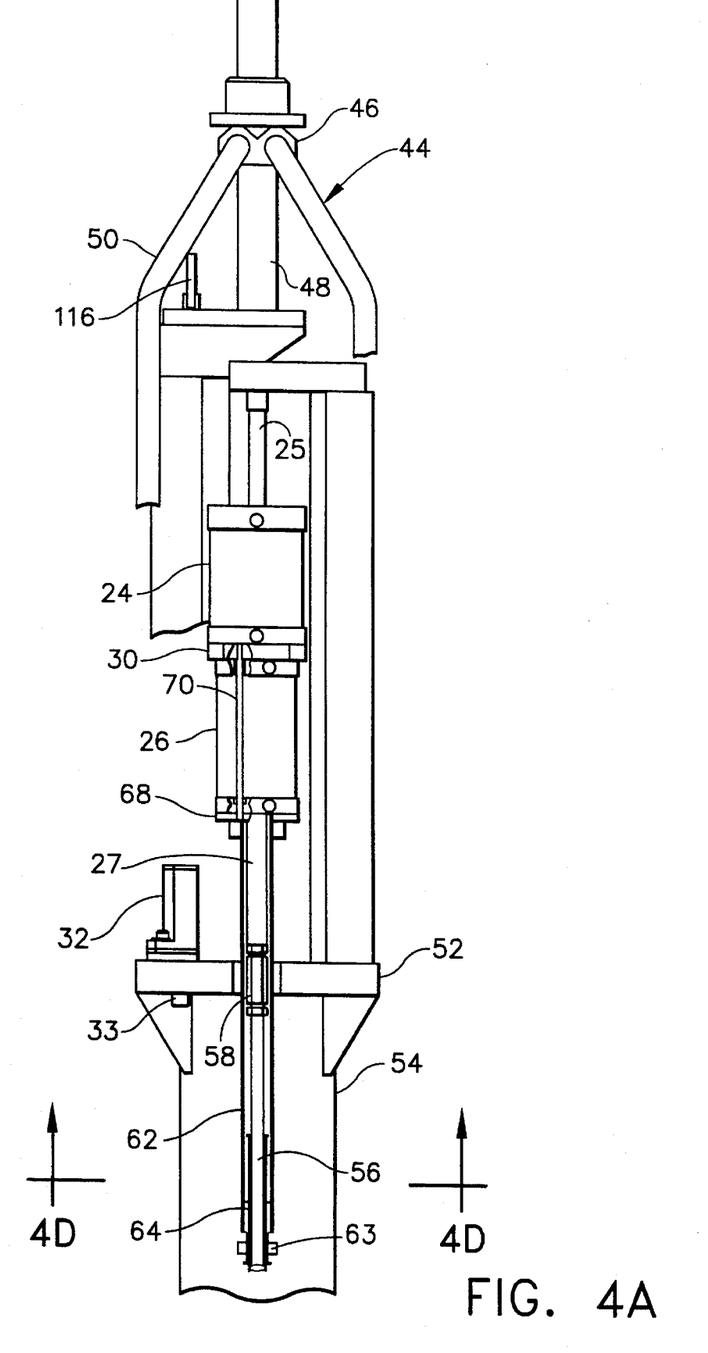
FIGS. 4A and 4B are elevation views of the upper portion of the unlatching tool in accordance with the preferred embodiment of the invention, the views being taken at 180° relative to each other.

The structure and operation of the control rod unlatching tool in accordance with the preferred embodiment of the invention is shown in detail in FIGS. 4A–4D, 5, 6A–6C, and 7. Referring to FIG. 4A, the frame assembly comprises a frame 44 having a coupling 46 which is slidable relative to a guide shaft 48. Frame 44 further comprises four frame members 50 having upper ends connected to coupling 46 and lower ends connected to the four corners of a square base 52. The base 52 rests on top of the control rod handle when the unlatching tool is lowered into position. The four-way valve 32 is mounted on base 52. The pushbutton 33 protrudes through an opening in base 52 and is positioned such that it will bear against the extended handle 8 of control rod 10 (see FIG. 2A), but will not bear against the standard handle 8' of control rod 10' (see FIG. 2B). Pushbutton 33 is slidable in the opening in opposition to spring loading. A pair of angles 54 (see FIG. 4D) extend from the bottom of base 52. Angles 54 are sized and positioned to fit over the cruciform control rod and guide the tool into a position whereat pushbutton 33 bears against the top of extended handle 8 (shown in FIG. 3A) when base 52 is resting thereon.

As seen in FIG. 4A, a second pneumatic cylinder 26 is piggybacked onto the positioning cylinder 24 via a cylinder spacer 30 and a cylinder bracket 68, which are held together by a threaded rod 70. The piston rod 27 of cylinder 26 is coupled to an actuator rod 56 by a coupling 58. A nut 60 threaded onto the end of actuator rod 56 acts as a stop as described in detail below.

The piston rod/actuator rod coupling is slidable in a tube assembly comprising outer tube 62 and inner tube 64. For the purpose of tool assembly, inner tube 64 is slidable inside outer tube 62 to achieve a desired overall length of the tube assembly. The tubes are then locked together using a locking collar 63. The outer tube 62 is connected at its upper end to the cylinder bracket 68. The inner tube 64 is slidable in and laterally supported by a circular bore formed in a guide 66 welded to one of the angles 54. Inner tube 64 slides in guide 66 in response to actuation of positioning cylinder 24. Travel of tube 64 is controlled by the length of stroke of cylinder 24. Collar 72 is a stop for rear nut 92 and a reaction point for springs 78.

Figures 6A, 6B:
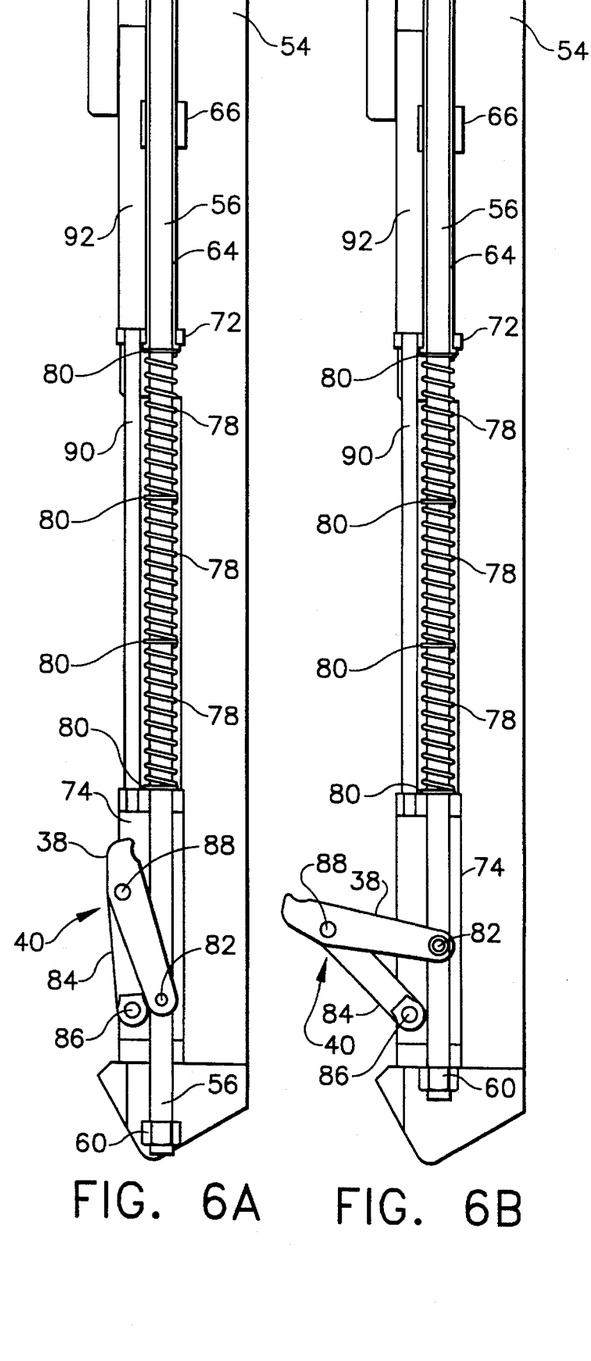
FIGS. 6A through 6C are elevation views of the lower portion of the unlatching tool shown in FIG. 5, the angle of viewing being rotated by 90° relative to the angle in FIG. 5, showing the actuator link retracted (FIG. 6A), extended (FIG. 6B) and lifted (FIG. 6C) while the positioning cylinder is extended (when the tool is mounted on an extended handle control rod).
Figure 6C:
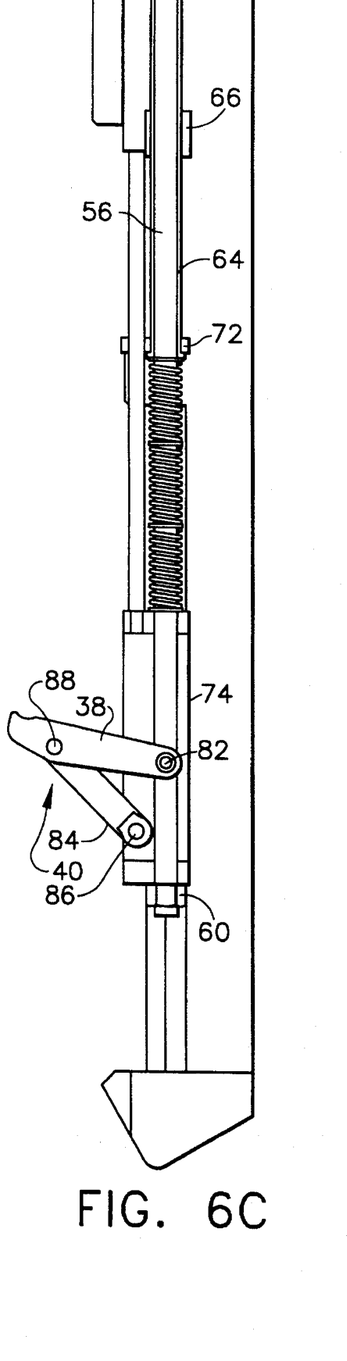

As described previously, operation of pushbutton 33 when the unlatching tool is placed on an extended handle control rod changes the state of the four-way valve 32 to activate the positioning cylinder 24. As a result, the positioning cylinder 24 is displaced vertically downward (e.g., about 3 inches), carrying the piggybacked cylinder 26, the actuator rod 56, the tube assembly (tubes 62 and 64), and the actuator linkage mechanism 40 with it. The positions of actuator rod 56, inner tube 64 and actuator linkage mechanism 40 when positioning cylinder 24 is extended are seen in FIGS. 6A–6C. As a result of this downward travel of rod 56 and mechanism 40, the actuator finger 38 will be positioned at the correct elevation to engage the D-ring unlocking handle 20 (see FIG. 2A) when pneumatic cylinder 26 is retracted. FIGS. 6A–6C show the subsequent positions of actuator rod 56, inner tube 64 and actuator linkage mechanism 40 while positioning cylinder 24 is extended. The operation of actuating rod 56 and actuator linkage mechanism 40 is the same for both the extended and retracted states of positioning cylinder 24.

The actuator rod 56 extends through inner tube 64 and then through an actuator carriage 74, which is vertically slidable between a pair of tracks 76 (see FIG. 5) installed in a cutout in the same angle 54 to which guide 66 is welded. Actuator rod 56 is slidable relative to carriage 74. Three springs 78 separated by washers 80 are installed in series between actuator carriage 74 and collar 72. These springs encircle the portion of actuator rod 56 which extends between collar 72 and carriage 74 and are preloaded to urge actuator carriage 74 away from collar 72. Thus, springs 78 urge carriage 74 downward.

As shown in FIGS. 5 and 6A–6C, the actuator linkage mechanism 40 comprises an actuator finger 38 in the form of a clevis rotatable about a pivot pin 82 inserted in actuator rod 56 and an actuator link 84 which is rotatable about pivot pin 86 rotatably mounted in actuator carriage 74. The distal ends of finger 38 and link 84 are pivotably coupled by a pivot pin 88. FIG. 6A shows the position of actuator rod 56 when piston rod 27 (see FIG. 4A) of cylinder 26 is in the extended position. When piston rod 27 is retracted, actuator rod 56 displaces upward relative to carriage 74 until stop nut 60 contacts the carriage. As a result of this relative displacement, pivot pin 82 is raised relative to pivot pin 86, causing finger 38 to move from the retracted position shown in FIG. 6A to the extended position shown in FIG. 6B.

As the piston rod 27 (FIG. 4A) continues to be retracted, actuator rod 56 continues to rise. During this upward travel, stop nut 60 carries carriage 74 along so that rod 56 and carriage 74 displace upward in tandem. This in turn causes finger 38 to displace upward. During its upward travel, finger 38 engages and then lifts the D-ring unlocking handle 20 (FIG. 2A) to uncouple lock plug 14 from spud 22 (see FIG. 1B). The upward position of the actuator linkage mechanism is shown in FIG. 6C.

As seen in FIG. 6A, collar 72 has a circular hole in which inner tube 64 is attached. Collar also has a second hole, smaller than the first, for receiving a stop rod 90, which is slidable therein and laterally supported thereby. One end of stop rod 90 is connected to actuator carriage 74. As a result, stop rod 90 moves in tandem with carriage 74. The other end of stop rod 90 has a rear nut 92 threaded thereon. The rear nut is positioned above collar 72 and will not pass through the second hole in collar 72 when carriage 74 travels downward in response to extension of piston rod 27 (see FIG. 4A). At the point where rear nut 92 engages collar 72, further downward travel of stop rod 90 and carriage 74 connected thereto is blocked. Therefore, as piston rod 27 continues to extend, actuator rod 56 continues to displace downward while the carriage 74 is stopped. This relative displacement of actuator rod 56 causes the finger 38 to retract.

Figure 4B:
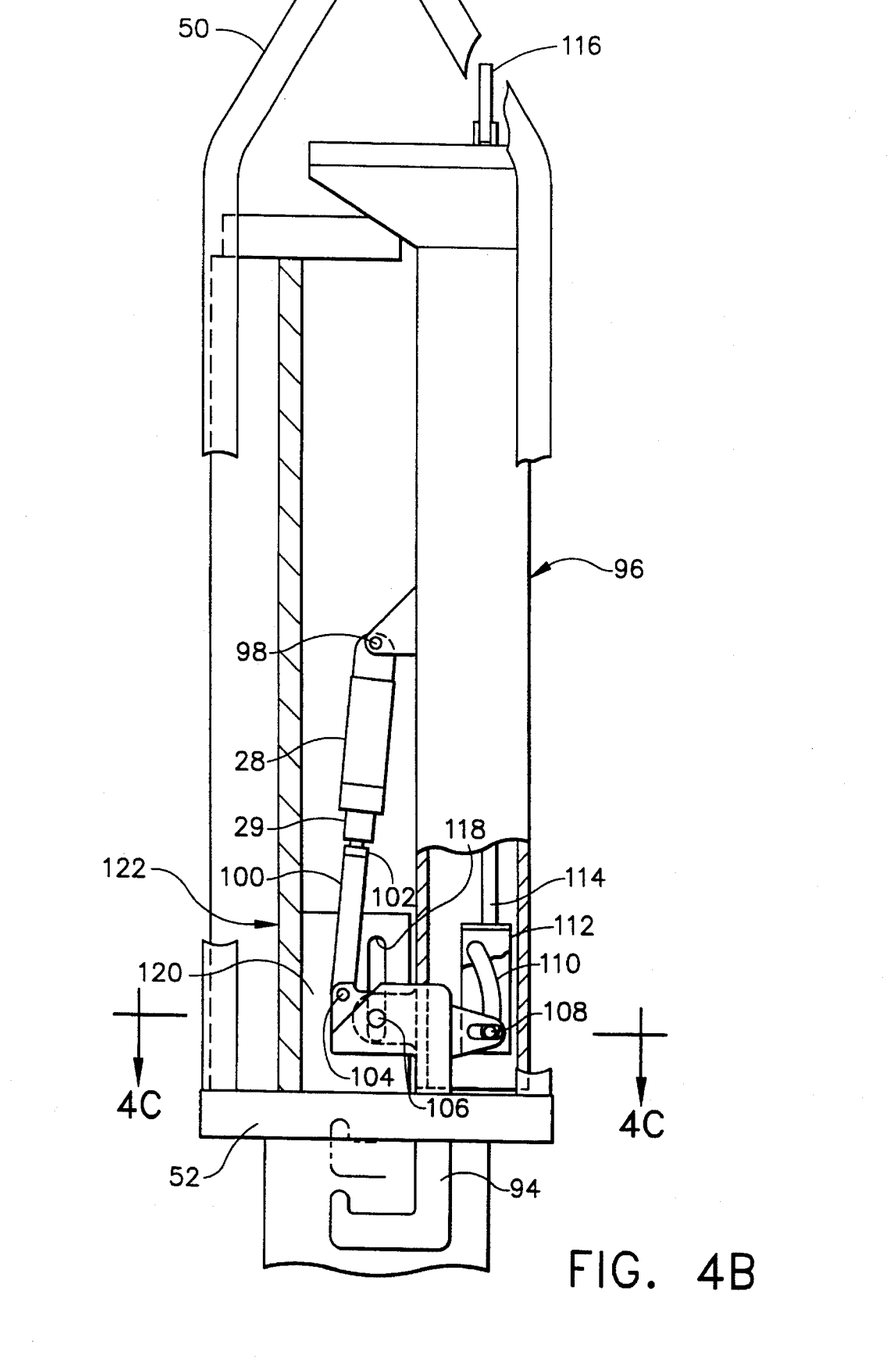
Figure 4C:
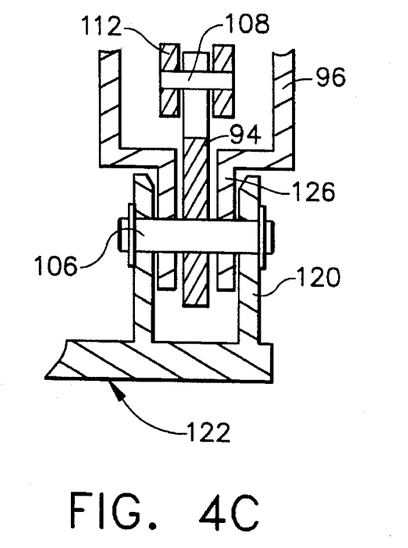
FIG. 4C is a sectional view taken along section line 4C—4C shown in FIG. 4B.
Figure 4D:
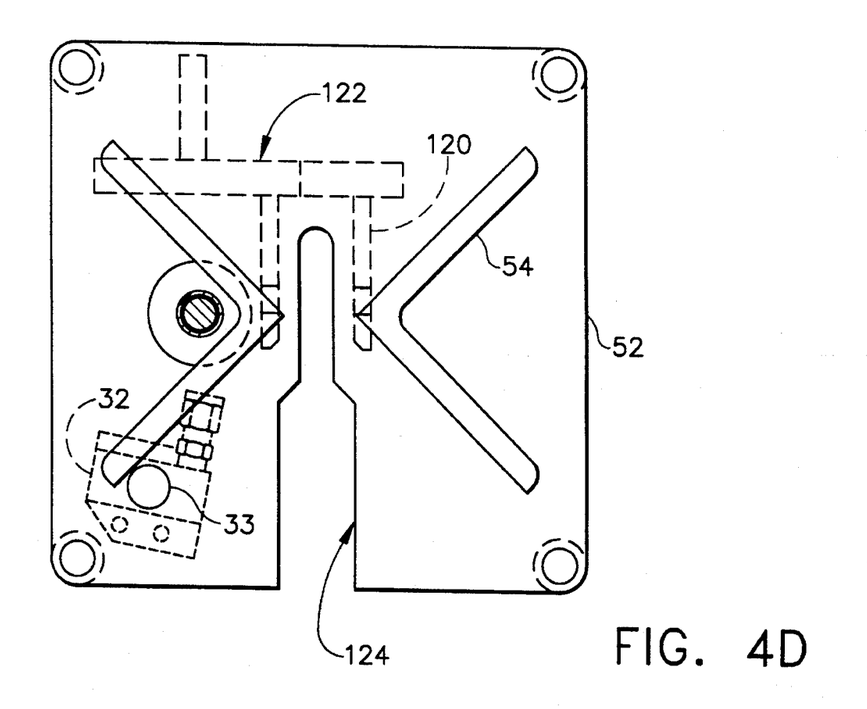
FIG. 4D is an end view of the tool with the grapple hook removed for ease of understanding.
Figure 5:
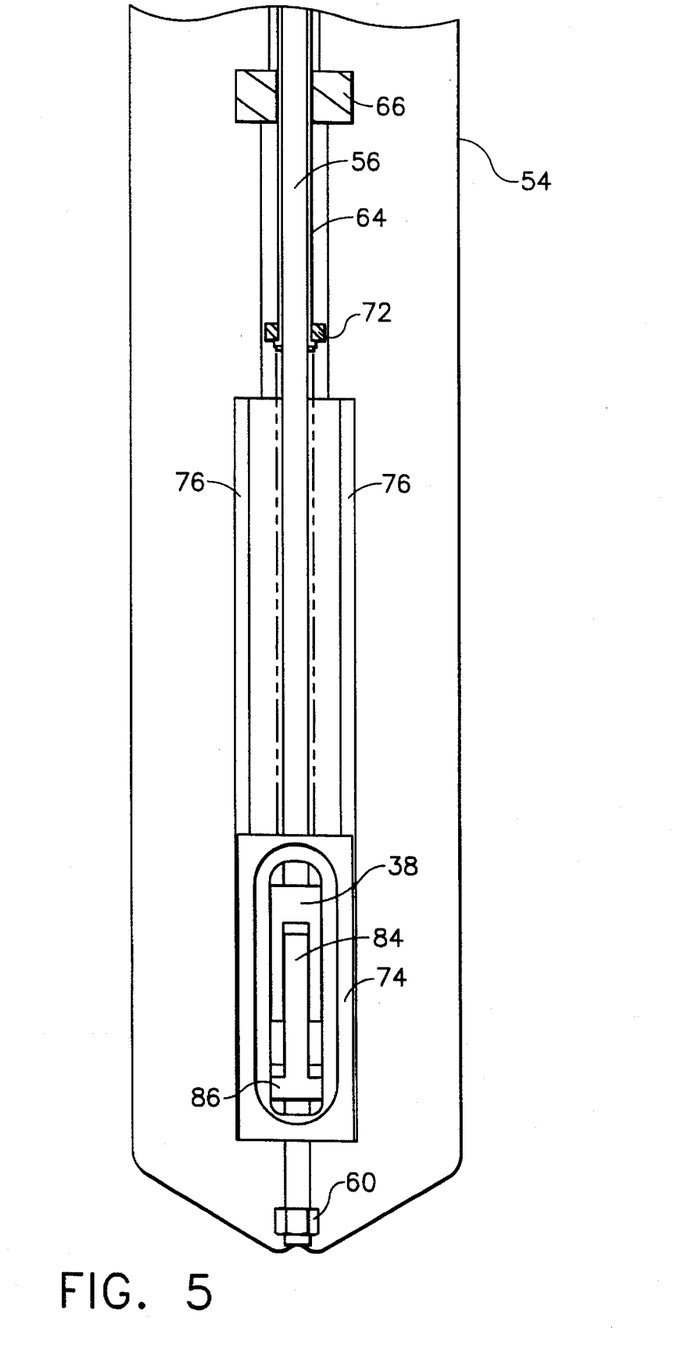
FIG. 5 is an elevation view of the lower portion of the unlatching tool, the angle of viewing being the same as the angle in FIG. 4A.

At the same time that piston rod 27 is being retracted to facilitate lifting of the control rod unlocking handle (see FIG. 4A), the piston rod 29 is being retracted to cause the grapple hook 94 to rotate into position underneath the control rod handle (see FIG. 4B). The grapple hook 94 extends through a slot 124 formed in the base plate 52 (see FIG. 4D).

Referring to FIG. 4B, the pneumatic cylinder 28 has one end pivotably mounted to the grapple hook and lifting tube assembly 96 by way of a pivot pin 98. The distal end of the piston rod 29 is connected to a clevis 100 by a nut 102. The end of clevis 100 remote from nut 102 is pivotably coupled to the grapple hook 94 by a pivot pin 104.

The grapple hook has a pivot pin 106 which extends on opposite sides thereof. The ends of pivot pin 106 are rotatably mounted in a pair of holes formed in respective brackets 126 (see FIG. 4C) connected to the grapple hook and lifting tube assembly 96. The entire assembly 96, including grapple hook 94, is displaceable vertically upward away from the base plate 52 of the frame assembly 44. During this upward displacement, the pivot pin 106 rides in slots 118 formed in respective brackets 120, which extend from frame member 122 and are connected to base plate 52.

Figure 7:
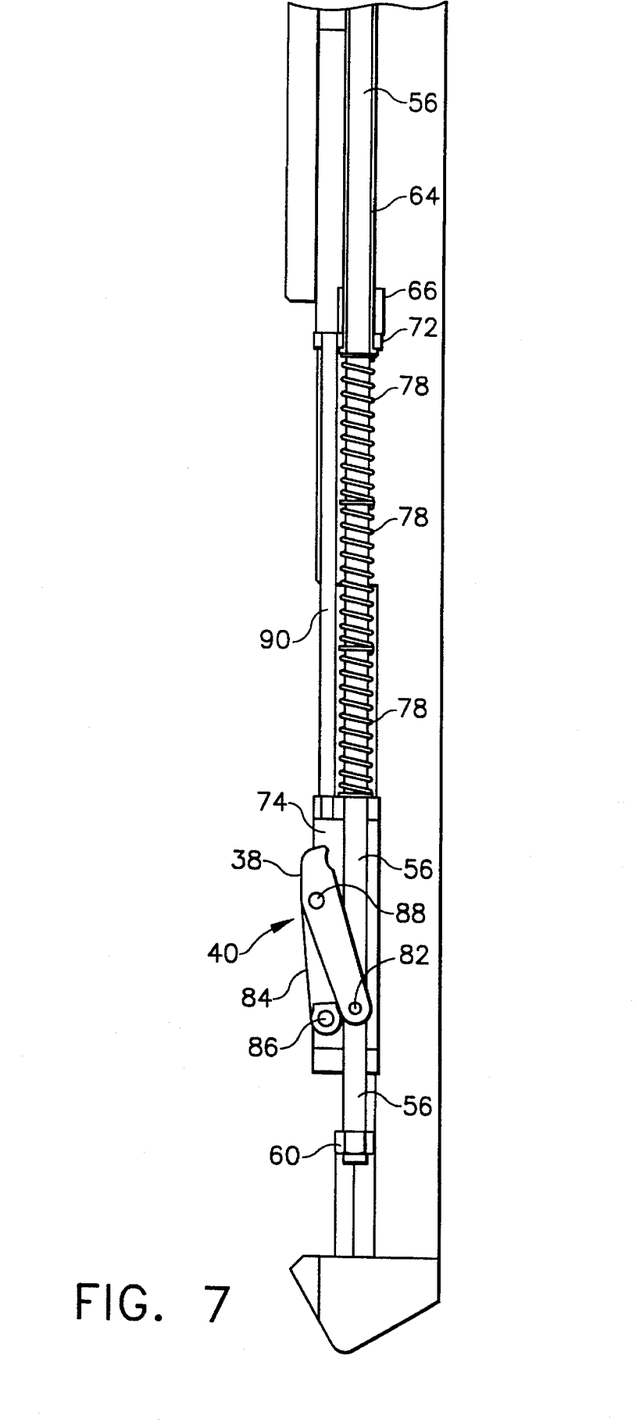
FIG. 7 is an elevation view showing the actuator link retracted and the positioning cylinder retracted (when the tool is mounted on a standard handle control rod).

The sequence of operations for uncoupling and lifting a control rod from its associated control rod drive is as follows. First, the grapple hook is placed in a position whereat it will not engage the control rod handle as the tool is lowered onto the control rod. The tool is lowered onto the control rod until the base plate 52 rests on the control rod handle. If the control rod has a standard handle, the pushbutton 33 will not engage the handle and the actuator linkage mechanism 40 is in the correct position (as shown in FIG. 7). If the control rod has an extended handle, then pushbutton 33 will engage the handle and the positioning cylinder 24 will be activated, causing the actuator linkage mechanism 40 to be lowered about 3 inches into the required position (as shown in FIG. 6A).

When the actuator linkage mechanism 40 is in the correct position, cylinder 26 is actuated to cause the actuator finger 38 to extend and then displace vertically upward (as shown in FIGS. 6B and 6C). Finger 38 engages the unlocking handle and lifts it vertically upward to uncouple the control rod from the control rod drive.

At the same time, cylinder 28 is actuated to cause the grapple hook 94 to rotate underneath the control rod handle to the position shown in solid lines in FIG. 4B. With the control rod uncoupled from the control rod drive and the grapple hook positioned underneath the control rod handle, the hoist (not shown) is operated to lift the guide shaft 48 and the grapple hook and lifting assembly 96 connected thereto. The guide shaft 48 displaces upward while the frame assembly 44, which is slidable relative to shaft 48 via coupling 46, remains stationary. Thus, the assembly 96 is lifted off of the base plate 52, carrying the grapple hook with it. When grapple hook 94 reaches the position shown in phantom in FIG. 4B, the control rod handle is secured and cannot fall off the grapple hook. At this point the pivot pin 106 has reached the upper end of the slots 118 formed in brackets 120 connected to base plate 52. Therefore, further lifting with the hoist causes the entire tool, and the control rod hanging therefrom, to be lifted and removed.

The sequence of events is reversed in order to install a control rod. In the event that the grapple hook 94 cannot be rotated out to its release position due to malfunction, the control rod can be released manually by lifting up a release hook 116 which is mounted on the upper frame of the grapple hook and lifting assembly 96. Hook 116 is connected to a release clevis 112 via a rod 114. Release clevis 112 has a planar slot for receiving an extension of grapple hook 94 (see FIG. 4C) and a pair of arcuate slots 110 (one of which is depicted in FIG. 4B) which communicate with the radial slot. The grapple hook extension carries a dowel pin 108, the opposed ends of which ride in arcuate slots 110 during rotation of grapple hook 94 about pivot pin 106 in response to actuation of cylinder 28. However, when the grapple hook cannot be rotated by cylinder 28 due to malfunction, the control rod can be released by lifting release clevis 112. Since the dowel pin 108 is seated at the bottom of the arcuate slots 110, lifting of clevis 112 causes the grapple hook to rotate to its release position.

The preferred embodiment of the control rod unlatching tool has been disclosed for the purpose of illustration. Variations and modifications of the disclosed structure which do not depart from the concept of this invention will be readily apparent to persons skilled in the art of mechanical engineering. All such variations and modifications are intended to be encompassed by the claims set forth hereinafter.

We claim:

1. A tool for unlatching extended handle and standard handle control rods from their associated control rod drives, comprising:

a first frame assembly having an axis;

a second frame assembly slidably coupled to said first frame assembly;

a grapple hook pivotably coupled to said first frame assembly;

means for rotating said grapple hook between first and second angular positions, said grapple hook rotating means being mounted on said first frame assembly;

a connecting element;

first displacing means for axially displacing said connecting element relative to said second frame assembly;

an actuator rod;

an actuator finger pivotably coupled to said actuator rod;

actuator linkage means for rotating said actuator finger relative to said actuator rod during axial displacement of said actuator rod relative to said actuator linkage means; and second displacing means for axially displacing said actuator rod relative to said connecting element.

2. The tool as defined in claim 1, wherein said first displacing means comprises a first pneumatic cylinder, said second displacing means comprises a second pneumatic cylinder, and said connecting element connects said second pneumatic cylinder to said first pneumatic cylinder.

3. The tool as defined in claim 2, wherein said first displacing means further comprises a first piston rod connected to said second frame assembly.

4. The tool as defined in claim 3, wherein said second displacing means further comprises a second piston rod coupled to said actuator rod.

5. The tool as defined in claim 1, further comprising means for automatically actuating said first displacing means in response to said tool being mounted on an extended handle control rod, but not in response to said tool being mounted on a standard handle control rod.

6. The tool as defined in claim 2, further comprising:

valve means for actuating said first pneumatic cylinder when said valve means is in a first state and not actuating said first pneumatic cylinder when said valve means is in a second state different than said first state; and a pushbutton for changing the state of said valve means from said second state to said first state in response to depression of said pushbutton, said pushbutton being positioned to be depressed by the control rod handle when said tool is mounted on an extended handle control rod and not be depressed by the control rod handle when said tool is mounted on a standard handle control rod.

7. The tool as defined in claim 2, wherein said actuator linkage mechanism comprises a carriage slidably mounted on said second frame assembly and slidably coupled to said actuator rod, and an actuator link pivotably coupled at one end to said actuator finger and pivotably coupled at the other end to said carriage.

8. A tool for unlatching extended handle and standard handle control rods from their associated control rod drives, comprising:

a support frame;

a connecting element;

first displacing means for displacing said connecting element relative to said support frame along an axis;

an actuator rod aligned with said axis;

an actuator finger pivotably coupled to said actuator rod, the axis of rotation of said actuator finger being perpendicular to said axis;

actuator linkage means for rotating said actuator finger relative to said actuator rod during axial displacement of said actuator rod relative to said actuator linkage means; and second displacing means for axially displacing said actuator rod relative to said connecting element.

9. The tool as defined in claim 8, wherein said first displacing means comprises a first pneumatic cylinder, said second displacing means comprises a second pneumatic cylinder, and said connecting element connects said second pneumatic cylinder to said first pneumatic cylinder.

10. The tool as defined in claim 9, wherein said first displacing means further comprises a first piston rod connected to said support frame, and said second displacing means further comprises a second piston rod coupled to said actuator rod.

11. The tool as defined in claim 8, further comprising means for automatically actuating said first displacing means in response to said tool being mounted on an extended handle control rod, but not in response to said tool being mounted on a standard handle control rod.

12. The tool as defined in claim 9, further comprising:

valve means for actuating said first pneumatic cylinder when said valve means is in a first state and not actuating said first pneumatic cylinder when said valve means is in a second state different than said first state; and a pushbutton for changing the state of said valve means from said second state to said first state in response to depression of said pushbutton, said pushbutton being positioned to be depressed by the control rod handle when said tool is mounted on an extended handle control rod and not be depressed by the control rod handle when said tool is mounted on a standard handle control rod.

13. The tool as defined in claim 8, wherein said actuator linkage mechanism comprises a carriage slidably mounted on said support frame and slidably coupled to said actuator rod, and an actuator link pivotably coupled at one end to said actuator finger and pivotably coupled at the other end to said carriage.

14. The tool as defined in claim 13, further comprising a tube assembly connected to said second displacing means and surrounding a portion of said actuator rod, a radially outward extending member connected to the bottom edge of said tube assembly, and spring means arranged with preload between said radially outward extending member and said carriage.

15. The tool as defined in claim 14, further comprising a stop rod slidably coupled to said radially outward extending member, said stop rod having one end connected to said carriage and having a radial projection which limits downward sliding of said carriage when said radial projection engages said radially outward extending member.

16. The tool as defined in claim 15, further comprising carriage lifting means mounted on the end of said actuator rod, said carriage lifting means contacting said carriage during upward axial displacement of said actuator rod and after said actuator finger has been extended, whereby said extended actuator finger is displaced axially upward.

17. A tool for unlatching extended handle and standard handle control rods from their associated control rod drives, the extended handle control rod having an unlocking handle separated from the top of the control rod handle by a first predetermined distance and the standard handle control rod having an unlocking handle separated from the top of the control rod handle by a second predetermined distance different than said first predetermined distance, comprising:

a support frame;

a connecting element;

first displacing means for displacing said connecting element relative to said support frame along an axis;

means for lifting the unlocking handle of a control rod; and second displacing means for axially displacing said unlocking handle lifting means relative to said connecting element.

18. The tool as defined in claim 17, wherein said first displacing means comprises a first pneumatic cylinder, said second displacing means comprises a second pneumatic cylinder, and said connecting element connects said second pneumatic cylinder to said first pneumatic cylinder.

19. The tool as defined in claim 17, further comprising means for automatically actuating said first displacing means in response to said tool being mounted on an extended handle control rod, but not in response to said tool being mounted on a standard handle control rod.

20. The tool as defined in claim 18, further comprising:

valve means for actuating said first pneumatic cylinder when said valve means is in a first state and not actuating said first pneumatic cylinder when said valve means is in a second state different than said first state; and a pushbutton for changing the state of said valve means from said second state to said first state in response to depression of said pushbutton, said pushbutton being positioned to be depressed by the control rod handle when said tool is mounted on an extended handle control rod and not be depressed by the control rod handle when said tool is mounted on a standard handle control rod.

* * * * *